United States Patent Office 3,262,853
Patented July 26, 1966

3,262,853
NOVEL 20β-AMINO-5β-PREGNANES
Daniel Bertin, Montrouge, Lucien Nedelec, Clichy-sous-Bois, and Jacques Perronnet, Paris, France, assignors to Roussel-UCLAF, Paris, France, a corporation of France
No drawing. Filed Jan. 8, 1964, Ser. No. 336,363
Claims priority, application France, Jan. 16, 1963, 921,608; Apr. 12, 1963, 931,475
11 Claims. (Cl. 167—65)

The invention relates to novel 20-amino-5β-pregnanes having the formula

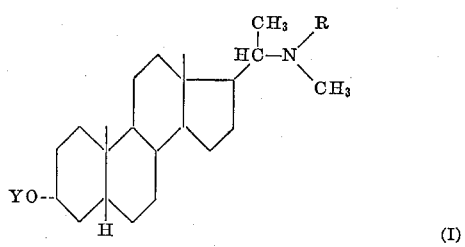

(I)

wherein R is an alkyl radical having 1 to 4 carbon atoms and Y is selected from the group consisting of hydrogen and an acyl radical of an organic carboxylic acid having 1 to 18 carbon atoms and their non-toxic, pharmaceutically acceptable acid addition salts. The invention also relates to a novel process for their preparation and to novel intermediates thereof. The invention also relates to spasmolytic compositions and to a method for treating coronary, vascular and visceral spasms.

A number of amino steroids are described in the chemical literature but these compounds have little interest from the physiological view. U.S. Patent No. 3,036,097 discloses the 20β-(N,N-dimethylamino)-allopregnane-3β-ol which is described only as an intermediate. This compound which is a stereo isomer of the products of the present invention is not only significantly different as a chemical compound but also possesses no significant physiological property. The said tertiary amine product had also been described by Cerny et al., Coll Czech., vol. 22 (1957), p. 76. On the contrary, the 20β-amino-5β-pregnanes of Formula I possesses interesting pharmacological properties, particularly spasmolytic, vasodilatatory and coronarodilatatory activity. They are useful for the treatment of asthma, bronchial spasms, arterial spasms or visceral spasms and of circulatory disturbances in the treatment of angina pectoris and of coronaritis.

It is an object of the invention to provide the novel 20β-amino-5β-pregnanes of Formula I.

It is another object of the invention to provide a novel process for the preparation of the 20β-amino-5β-pregnanes of Formula I.

It is a further object of the invention to provide novel intermediates for the 20β-amino-5β-pregnanes of Formula I.

It is an additional object of the invention to provide novel spasmolytic compositions.

It is a further object of the invention to provide a novel method of treating coronary, vascular and visceral spasms.

These and other objects and advantages of the invention will become obvious from the following detailed description.

The novel compounds of the invention are selected from the group consisting of 20β-amino-5β-pregnanes of the formula

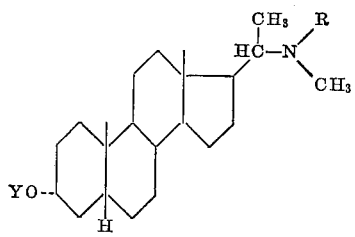

wherein R is an alkyl radical having 1 to 4 carbon atoms and Y is selected from the group consisting of hydrogen and an acyl radical of an organic carboxylic acid having 1 to 18 carbon atoms and their non-toxic, pharmaceutically acceptable acid addition salts.

The acyl radical of the organic carboxylic acid having 1 to 18 carbon atoms may be derived from an aliphatic, aromatic, cycloaliphatic or heterocyclic carboxylic acid. Examples of suitable acids are alkanoic acids, such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelarginic acid, capric acid, undecylic acid, lauric acid, myristic acid, palmitic acid and stearic acid; alkenoic acids such as undecylenic acid, linoleic acid, ricinoleic acid and oleic acid; cycloalkyl carboxylic acids such as cyclopentyl carboxylic acid, cyclopropyl carboxylic acid, cyclobutyl carboxylic acid and cyclohexyl carboxylic acid; cycloalkyl alkanoic acids such as cyclopentyl acetic acid, cyclohexyl acetic acid, cyclopentyl propionic acid and cyclohexyl propionic acid; arylalkanoic acids such as phenyl acetic acid and phenyl propionic acid; aryl carboxylic acids such as p-phenyl benzoic acid, p-chlorohexyl benzoic acid, benzoic acid and 2,4-dinitrobenzoic acid; phenoxy alkanoic acids such as phenoxy acetic acid, p-chlorophenoxy acetic acid, 2,4-dichlorophenoxy acetic acid, 4-ter-butylphenoxy acetic acid, 3-phenoxy propionic acid and 4-phenoxy butyric acid; heterocyclic carboxylic acids such as furane-2-carboxylic acid, 5-ter-butylfurane-2-carboxylic acid, 5-bromofurane-2-carboxylic acid and nicotinic acids; β-ketoalkanoic acids, such as acetylacetic acid, propionylacetic acid and butyrylacetic acid; amino acids such as diethylaminoacetic acid and aspartic acid.

Examples of suitable acids for the formation of the acid addition salts are organic acids such as citric acid, tartaric acid, acetic acid, etc. and inorganic acids such as hydrochloric acid, nitric acid, etc.

The process of the invention for the preparation of 20β-amino-5β-pregnanes of Formula I comprises condensing 5β-pregnane-3α-ol-20-one with a primary amine of the formula

wherein R' is selected from the group consisting of an alkyl radical having 1 to 4 carbon atoms and benzyl to form the corresponding 20-amino-5β-pregnane-3α-ol, reducing the latter with an alkali metal borohydride to form the corresponding 20β-amino-5β-pregnane-3α-ol, subjecting the latter to hydrogenolysis if R' is benzyl, subjecting the 20β-amino-5β-pregnane-3α-ol to methylation to form the desired 20β-alkylmethylamino-5β-pregnane-3α-ol which can be esterified in the 3-position with an acylating agent such as an acid anhydride or acid halide. The process is illustrated in Table I.

TABLE I

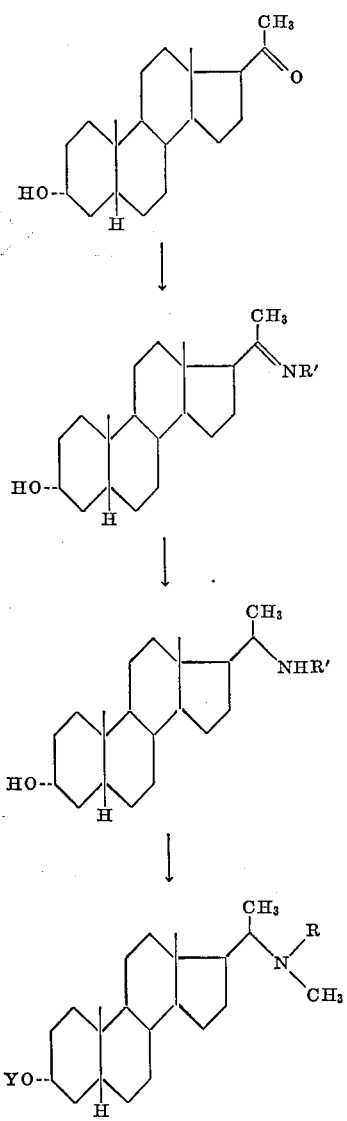

wherein R is an alkyl radical having 1 to 4 carbon atoms, R' is selected from the group consisting of benzyl and an alkyl radical having 1 to 4 carbon atoms and Y is selected from the group consisting of hydrogen and an acyl radical of an organic carboxylic acid having 1 to 18 carbon atoms.

A preferred mode of the process of the invention comprises condensing 5β-pregnane-3α-ol-20-one with monomethylamine in methanol and in the presence of sodium methylate to form 20-methylimino-5β-pregnane-3α-ol, reducing the latter with sodium borohydride in a lower alkanol such as ethanol to form 20β-(N-methylamino)-5β-pregnane-3α-ol, subjecting the latter to the action of formaldehyde in the presence of hydrogen and a catalyst to form 20β-(N,N-dimethylamino)-5β-pregnane-3α-ol.

Another preferred mode of the process of the invention comprises condensing 5β-pregnane-3α-ol-20-one with benzylamine in benzene and in the presence of an acid catalyst such as p-toluene sulfonic acid to form 20-benzylimino-5β-pregnane-3α-ol, reducing the latter with sodium borohydride in a lower alkanol such as ethanol to form 20β-(N-benzylamino)-5β-pregnane-3α-ol, subjecting the latter to the action of hydrogen in the presence of palladium as a catalyst to form 20β-amino-5β-pregnane-3α-ol, reacting the latter with a mixture of formaldehyde and formic acid to form 20β-(N,N-dimethylamino)-5β-pregnane-3α-ol.

The spasmolytic compositions of the invention are comprised of a compound selected from the group consisting of 20β-amino-5β-pregnanes of the formula

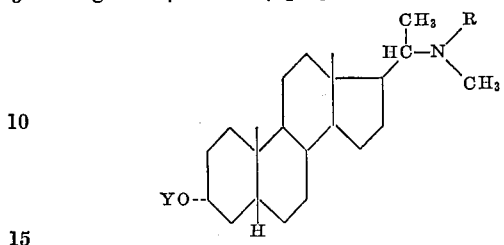

wherein R is an alkyl radical having 1 to 4 carbon atoms and Y is selected from the group consisting of hydrogen and an acyl radical of an organic carboxylic acid having 1 to 18 carbon atoms and their non-toxic, pharmaceutically acceptable acid addition salts and a major amount of a pharmacological carrier. The compositions can be prepared in the form of injectable solutions, injectable suspensions, prepared in impulses, in multiple dose flacons, in the form of tablets, of coated tablets, of drops or aerosols and of suppositories.

The method for treating coronary, vascular and visceral spasms comprises administering an effective amount of a compound selected from the group consisting of 20β-amino-5β-pregnanes of the formula

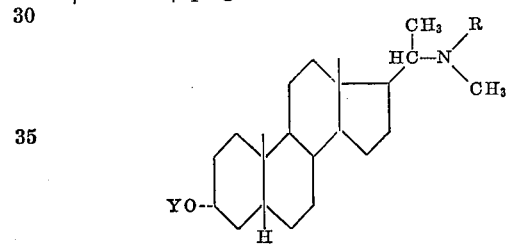

wherein R is an alkyl radical having 1 to 4 carbon atoms and Y is selected from the group consisting of hydrogen and an acyl radical of an organic carboxylic acid having 1 to 18 carbon atoms and their non-toxic, pharmaceutically acceptable acid addition salts. The said compounds may be administered orally, transcutaneously or rectally. The usual daily dosage is between 2 to 50 mg. in the adult depending upon the method of administration and the compound used.

In the following examples there are described several preferred embodiments to illustrate the invention. However, it is to be understood that the invention is not intended to be limited to the specific embodiments.

EXAMPLE I.—PREPARATION OF 20β-DIMETHYL-AMINO-5β-PREGNANE-3α-OL

Step A.—Preparation of 20-methylimino-5β-pregnane-3α-ol 13 gm. of 5β-pregnane-3α-ol-20-one and 3 gm. of sodium methylate were introduced into a solution of 39 cc. of monomethylamine in 70 cc. of methanol. The solution was cooled to —10° C. and 10 cc. of methanol were added to the solution. The reaction mixture was heated under pressure to 100° C. and periodically agitated for a period of one night. Then the entire reaction mixture was cooled to —10° C. and the crystals formed were vacuum filtered, washed successively with methanol and water and dried to obtain 9.8 gm. of raw 20-methylimino-5β-pregnane-3α-ol which was purified with recrystallization from ethanol. The purified crystals had a melting point of 220–222° C. and a specific rotation $[\alpha]_D^{20}=+58.5°\pm1°$ (c.=1% in ethanol).

The product was soluble in chloroform, slightly soluble in alcohols, acetone and benzene and insoluble in water.

Analysis.—$C_{22}H_{37}ON$; molecular weight=331.53; calculated: C, 79.70%; H, 11.25%; N, 4.22%. Found: C, 79.8%; H, 11.0%; N, 4.5%.

*Step B.—Preparation of 20β-methylamino-5β-pregnane-3α-ol*

3 gm. of 20-methylimino-5β-pregnane-3α-ol were introduced into 90 cc. of ethanol and the solution was slightly cooled. Then 0.9 gm. of sodium borohydride were added and the reaction mixture was agitated for a period of two hours at room temperature and under an atmosphere of nitrogen. The reaction mixture was then poured on ice and the precipitate was vacuum filtered, washed with water and dried in an oven. The product obtained was dissolved in isopropanol and a current of hydrochloric acid gas was passed through the solution until an acid reaction was obtained. The solution was iced and the crystals were vacuum filtered, washed with isopropanol and dried. The product was then dissolved in 8 cc. of ethanol and 16 cc. of water and 1.6 cc. of triethylamine were added thereto. The precipitate was vacuum filtered, washed with water and dried to obtain 1.424 gm. of 20β-methylamino-5β-pregnane-3α-ol having a melting point of 166° C. and a specific rotation $[\alpha]_D^{20} = +19°$ (c.=1% in ethanol).

*Step C.—Preparation of 20β-(N,N-dimethylamino)-5β-pregane-3α-ol*

For a period of 30 minutes a mixture of 0.667 gm. of 20β-(N-methylamino)-5β-pregnane-3α-ol, 30 cc. of methanol, 1.3 cc. of aqueous 40% formaldehyde solution and 0.33 gm. of palladium hydroxide on carbon black was hydrogenated. Thereafter, the catalyst was filtered and the reaction mixture was washed with methanol and evaporated to dryness. 10 cc. of water were added thereto and then several drops of sodium hydroxide solution. The precipitate obtained was vacuum filtered and washed with water. The product was then dissolved in 20 cc. of hot methanol and iced and the precipitate was vacuum filtered to obtain 0.3 gm. of 20β-(N,N-dimethylamino)-5β-pregnane-3α-ol having a melting points of 166–167° C. and a specific rotation $[\alpha]_D^{20} = +29° \pm 2°$ (c.=0.7% in ethanol).

The product occurred in the form of colorless crystals and was insoluble in water, slightly soluble in alcohol and ether and soluble in chloroform.

*Analysis.*—$C_{23}H_{41}ON$; molecular weight=347.56; calculated: C, 79.48%; H, 11.89%; N, 4.03%. Found: C, 79.6%; H, 11.7%; N, 4.2%.

The product is not described in the literature.

EXAMPLE II.—PREPARATION OF 20β-DIMETHYLAMINO-5β-PREGNANE-3α-OL

*Step A.—Preparation of 20-benzylimino-5β-pregnane-3α-ol*

A mixture of 10 gm. of 5β-pregnane-3α-ol-20-one, 200 cc. of benzene, 10 cc. of benzylamine and 750 mg. of p-toluene sulfonic acid was heated to reflux for a period of four hours under an atmosphere of nitrogen. The solution was concentrated and 200 cc. of sulfuric ether were added thereto. Then the solution was filtered and a stream of carbon dioxide was passed through the filtrate for a period of 30 minutes. The solution was filtered and the filtrate was evaporated to dryness under vacuum to obtain 12.75 gm. (quantitative yield) of 20-benzylimino-5β-pregnane-3α-ol having a melting point of 120–130° C.

The product occurred in the form of white crystals insoluble in water and dilute aqueous acids and alkalis and soluble in alcohol, ether and benzene.

The compound is not described in the literature.

*Step B.—Preparation of 20β-benzylamino-5β-pregnane-3α-ol*

A mixture of 12.75 gm. of 20-benzylimino-5β-pregnane-3α-ol, 350 cc. of ethanol and 4.0 gm. of sodium borohydride was agitated for a period of 3 hours at room temperature and under an atmosphere of nitrogen. 35 cc. of acetic acid containing 50% water were added to the reaction mixture. Then the reaction mixture was alkalinized with concentrated sodium hydroxide solution and 200 cc. of water were added thereto. The reaction mixture was extracted with sulfuric ether and the extract was washed with water saturated with sodium chloride, dried over magnesium sulfate and evaporated to dryness under vacuum. The residue was subjected to chromatography through silica with elution with benzene containing 2.5% of methanol to obtain 6.7 gm. of raw 20β-benzylamino-5β-pregnane-3α-ol which could be utilized as such for the next step of the synthesis.

This compound is not described in the literature.

*Step C.—Preparation of 20β-amino-5β-pregnane-3α-ol*

2 gm. of 20β-benzylamino-5β-pregnane-3α-ol were dissolved in 40 cc. of ethanol and 1 gm. of carbon black containing palladium was added thereto along with 10 cc. of ethanol and 5.2 cc. of acetic acid. The reaction mixture was hydrogenated and then the reaction mixture was filtered. The filtrate was evaporated to dryness under vacuum and the residue was dissolved in sulfuric ether and subjected to a current of gaseous hydrochloric acid. The product obtained was decanted, water was added and then some sodium hydroxide solution and the product was extracted with ether. After evaporating the extract to dryness, 760 mg. of 20β-amino-5β-pregnane-3α-ol having a melting point of 168–169° C. and a specific rotation $[\alpha]_D^{20} = +12° \pm 1°$ (c.=1% in methanol) were obtained after crystallization from cyclohexane.

The product occurred in the form of white crystals and was insoluble in water and dilute aqueous alkalis and soluble in dilute aqueous acids, alcohol, ether, acetone, benzene and chloroform.

*Analysis.*—$C_{21}H_{37}NO$; molecular weight=319.51; calculated: C, 78.94%; H, 11.67%; N, 4.38%. Found: C, 78.8%; H, 11.7%; N, 4.7%.

This compound is not described in the literature.

*Step D.—Preparation of 20β-(N,N-dimethylamino)-5β-pregnane-3α-ol*

A mixture of 2.2 gm. of 20β-amino-5β-pregnane-3α-ol, 22.0 cc. of 40% aqueous formaldehyde and 22.0 c. of formic acid was heated to reflux under an atmosphere of nitrogen for a period of 24 hours. After cooling the reaction mixture, 220 cc. of water were added thereto and the reaction mixture was neutralized by the addition of sodium hydroxide solution. The neutralized mixture was extracted with benzene and the extract was washed, dried and evaporated to dryness under vacuum. The residue was dissolved in 50 cc. of methanol and after 5 cc. of sodium hydroxide solution were added, the reaction mixture was allowed to stand for a period of 30 minutes at room temperature. Then the reaction mixture was poured on ice and the precipitate was vacuum filtered and washed to obtain 1.70 gm. (71% yield) of 20β-(N,N-dimethylamino)-5β-pregnane-3α-ol which was identical to the product obtained according to Example I.

EXAMPLE III.—PREPARATION OF 3α-ACETOXY-20β-(N,N-DIMETHYLAMINO)-5β-PREGNANE

A mixture of 2.55 gm. of 20β-(N,N-dimethylamino)-5β-pregnane-3α-ol, 15.0 cc. of anhydrous pyridine, 7.5 cc. of anhydride and 5.0 cc. of chloroform was agitated for 2 hours at room temperature. Thereafter the reaction mixture was vacuum filtered and the filtrate was washed, dried and concentrated. After recrystallization of the product obtained from methanol, 1.596 gm. of 3α-acetoxy-20β-(N,N-dimethylamino)-5β-pregnane having a melting point of 120° C. and a specific rotation $[\alpha]_D^{20} = +46° \pm 2°$ (c.=0.5% in ethanol)

were obtained.

The product occurred in the form of colorless crystals and was insoluble in water and dilute aqueous alkalis, slightly soluble in alcohol and soluble in dilute aqueous acids, ether and chloroform.

*Analysis.*—$C_{25}H_{43}O_2N$; molecular weight=389.60; calculated: C, 77.07%; H, 11.12%; N, 3.59%. Found: C, 77.1%; H, 11.0%; N, 3.8%.

The product is not described in the literature.

EXAMPLE IV.—PREPARATION OF 3α-(N',N'-DIMETHYLAMINOACETOXY)-20β-(N,N - DIMETHYLAMINO)-5β-PREGNANE 1.042 gm. of 20β-(N,N-dimethylamino)-5β-pregnane-3α-ol were agitated in 21 cc. of chloroform under an atmosphere of nitrogen. 2.370 gm. of the hydrochloric acid salt of N,N-dimethylglycyl chloride were added thereto and the reaction mixture was heated to reflux under an atmosphere of nitrogen for a period of 30 minutes. Then the reaction mixture was cooled and poured into a saturated solution of sodium bicarbonate. The aqueous material was extracted with chloroform and the extract was washed and dried. After crystallization in ethanol, then from a mixture of benzene and methanol, 0.899 gm. of 3α-(N',N'-dimethylaminoacetoxy)-20β-(N,N-dimethylamino)-5β-pregnane having a melting point of 118° C. and a specific rotation $[\alpha]_D^{20} = +47° \pm 1.5°$ (c.=0.7% in ethanol) were obtained.

The product occurred in the form of colorless crystals and was insoluble in water, slightly soluble in alcohol, and soluble in dilute aqueous acids, benzene and chloroform.

The product is not described in the literature.

PREPARATION OF THE DIHYDROCHLORIDE SALT 795 mg. of 3α-(N',N'-dimethylaminoacetoxy)-20β-(N,N-dimethylamino)-5β-pregnane were dissolved in 6 cc. of a solution of 0.6 N hydrochloric acid in isopropanol. The reaction mixture was filtered and concentrated while simultaneously adding methylethyl ketone. The dihydrochloride salt crystallized and the crystals were vacuum filtered, washed with methylethyl ketone and dried to obtain 622 mg. of the dihydrochloride salt of 3α-(N',N'-dimethylaminoacetoxy) - 20β - (N,N-dimethylamino)-5β-pregnane having a melting point of 200° C. (with decomposition) and a specific rotation $[\alpha]_D^{20} = +51°$ (c.=0.75% in ethanol).

The product occurred in the form of colorless crystals and was soluble in water and dilute aqueous acids and was slightly soluble in acetone.

*Analysis.*—$C_{27}H_{50}O_2N_2Cl_2$; molecular weight=505.59; calculated: C, 64.13%; H, 9.97%; N, 5.54%; Cl, 14.03%. Found: C, 63.9%; H, 9.7%; N, 5.6%; Cl, 13.1%.

The product is not described in the literature.

PHARMACOLOGICAL DATA

I. *Action on the coronary blood flow.*—The effect of the products tested on the coronary blood flow was studied on the isolated rabbit heart previously intoxicated by barium salt according to a technique inspired by Langendorff (Arch. gesam. Physiol., vol. 61, 1958, p. 291).

The rabbit heart was suspended by the aorta to a cannula and the coronary system was perfused by means of the cannula under a constant pressure of 5 cm. of Hg with Locke serum at a pH of 7.2 to 7.3 heated to 37° C. The test compounds were placed in solution in ethanol or distilled water if it was soluble in the said water. The resulting solution was then diluted with Locke serum to the desired concentrations. A three-way stop-cock permitted the instantaneous change from Locke serum to Locke serum containing the test compound.

On a proper apparatus, the coronary blood flow and parallelly the ventricular contractions were registered. The minimum concentrations of the said compounds which clearly augmented the coronary blood flow of such a preparation were systematically determined. Also determined were doses greater than the minimum active dose in order to determine the eventual increase of the duration or of the intensity of action of the compounds. The results are summarized in Table II.

TABLE II

| Compound studied | Minimum active concentration in μg. per cc. in the perfusion | Increase of coronary blood flow in percent of initial blood flow (Locke serum+BaCl₂) | Duration of action in minutes | Effect on ventricular contractions | |
|---|---|---|---|---|---|
| | | | | On the amplitude | On the frequency |
| Trinitrine | 1 | 57 | 13 | +15 (fugitive) | −150 |
| Papaverine | 1 | 60 | >20 | −30 | +15 |
| 20β-(N,N-dimethylamino)-5β-pregnane-3α-ol. | 0.001<br>0.01 | 10 to 70<br>10 to 40 | 10 to 15<br>10 to 20 | Diminution<br>Slight diminution | 0<br>0 |
| 3α-(N',N'-dimethylaminoacetoxy)-20β-(N,N-dimethylamino)-5β-pregnane. | 0.01<br>0.1<br>1 | 4 to 5<br>30<br>20 | 6 to 13<br>15 to 20<br>15 | Slight increase<br>do<br>No modification | 0<br>0<br>0 |

The minimum active concentration is about 0.001 μg./cc. for 20β-(N,N-dimethylamino)-5β-pregnane-3α-ol and about 0.1 to 1 μg./cc. for 3α-(N',N'-dimethylaminoacetoxy)-20β-(N,N-dimethylamino)-5β-pregnane.

II. *Spasmolytic activity on the isolated intestine of the guinea pig.*—The spasmolytic activity was determined by the classic technique of Magnus with three contracturing agents; barium chloride, acetylcholine and histamine.

The test was made on the isolated intestine of the guinea pig in a cell containing 20 cc. of Tyrode liquid maintained at 37° C. and constantly oxygenated. A submaximal contraction of the intestinal loop was provoked by adding to the Tyrode liquid one of the three contracturing agents at an adequate concentration. The compounds studied were utilized either in solution in ethanol [20β-(N,N-dimethylamino) 5β-pregnane-3α-ol] or in solution in distilled water [dihydrochloride salt of 3α - (N,N' - dimethylaminoacetoxy)-20β-(N,N-dimethylamino)-5β-pregnane]. In the case of the compound in solution in ethanol, it was verified that the solvent utilized alone was without action on the preparation at the concentrations utilized.

Then the concentration of the test compounds which permitted the obtention of a decontraction of the organ was determined and after washing of the preparation, it was determined, on the other hand, the concentration of the compounds studied which inhibited the action of a new dose of the contracturing agent.

sive solute. It was injected in this form intraperitoneally to five groups of five or ten mice, at doses of 25, 50, 75, 100 and 150 mg./kg., respectively. The animals were held under observation for a period of one week.

TABLE III

| Compound studied | Concentrations expressed in γ/cc. of the bath of the compound studied producing the decontraction of the contracted organ or the inhibition of the action of the contracting agent | | | | | |
|---|---|---|---|---|---|---|
| | Guinea pig intestine + BaCl$_2$ | | Guinea pig intestine + Acetylcholine | | Guinea pig intestine + Histamine | |
| | Decontraction | Inhibition | Decontraction | Inhibition | Decontraction | Inhibition |
| Papaverine Hydrochloride | 20 | 30 | 15 | 20 | 10–15 | 15 |
| 20β-(N,N-Dimethylamino)-5α-pregnane-3α-ol | 2 | 2 | 5 | 5 | 5 | 5 |
| 3α-(N',N'-Dimethylaminoacetoxy)-20β-(N,N-dimethylamino)-5β-pregnane, dihydrochloride | 10 | 10 | 5 | 5 | 5 | 5 |

As can be seen from Table III, 20β-(N,N-dimethylamino)-5β-pregnane-3α-ol and 3α-(N',N'-dimethylaminoacetoxy)-20β-(N,N-dimethylamino)-5β-pregnane possess a clear, long lasting antagonistic action with reference to the three contracturing agents at lower concentrations than papaverine.

III. *Effect of the peripheric circulation.*—The vasodilatatory activity was studied on the isolated rabbits paw in situ according to a technique inspired from that described by Binet et al. (Presse Medical, 1949, p. 445). The animal was anesthetized with urethane and its blood was heparinated. The paw was isolated from the general circulation by high ligature of the femoral artery. The blood aspirated on carotide was perfused at a constant flow by the intermediary of a Jouvelet transfusion apparatus into the femoral artery of the isolated paw. The perfused artery was in addition connected to a Ludwig manometer which permitted the registration of the pressure in this artery and informs thus eventually on the vasodilation or vasoconstriction.

The compounds studied were placed in solution depending on the compound, either in physiological serum or in 92% acetyl methylamine, or in distilled water while utilizing a phosphate buffer. They were administered intravenously.

The determination of the peripheric vasodilatory effect was practiced (a) either on a level of the constriction obtained by the intravenous injection of barium chloride, (b) or while brutally increasing the blood flow of the Jouvelet apparatus, which produced an increase of pressure of the perfused paw. This increase was stabilized on a level which permitted the appreciation of the evenutal vasodilatatory effect of the product studied.

The minimum active dose for 20β-(N,N-dimethylamino)-5β-pregnane-3α-ol according to the first method was equal to 200 γ/kg. and according to the second procedure was equal to 500 γ/kg. Greater doses of 1 and 2 mg./kg. provoked a more pronounced peripheric vasodilatatory effect which appeared proportional to the injected doses. The said product was compared with known commercial products such as (1'-methyl-2'-phenoxyethylamino)-2-(hydroxy-4-phenyl)-1-propanol - hydrochloride and p-hydroxyphenyl butylamino ethanol sulfate and was clearly superior to the commercial products. The minimum active dose for 3α-(N',N'-dimethylaminoacetoxy)-20β-(N,N-dimethylamino)-5β-pregnane was 2 mg./kg.

IV. *Determination of the toxicity in acute experiments on mice:* (a) *20β-(N,N-dimethylamino) - 5β-pregnane-3α-ol.*—The toxicity test was effected on mice of the Rockland strain weighing between 18 and 22 gm. The compound was utilized in suspension in an aqueous disper- Following the injected doses, the animals presented a convulsive state more or less pronounced accompanied mortality starting from the dose of 75 mg./kg. The average lethal dose DL$_{50}$ was about 75 mg./kg., whereas the therapeutic dose is 2 to 50 mg. per day in the adult having a weight of 60 kg.

(b) *3α-(N',N'-dimethylaminoacetoxy) - 20β-(N,N-dimethylamino)-5β-pregnane.*—The toxicity test was effected in the same fashion at doses of 100 mg./kg. and 200 mg./kg. with the product being utilized in aqueous solution. The animals presented the following symptoms: prostration, motor incoordination, convulsive movements. The average lethal dose DL$_{50}$ was about 140 mg./kg.

Various modifications of the compositions and process of the invention may be made without departing from the spirit or scope thereof and it is to be understood that the invention is to be limited only as defined in the appended claims.

We claim:

1. A spasmolytic composition comprised of 2 to 50 mg. of the dihydrochloride salt of 3α-(N',N'-dimethylaminoacetoxy)-20β-(N,N-dimethylamino) - 5β - pregnane and a major amount of a pharmacological carrier.

2. A method for treating coronary, vascular and visceral spasms which comprises administering daily an effective amount of the dihydrochloride salt of 3α-(N',N'-dimethylaminoacetoxy) - 20β - (N,N - dimethylamino)-5β-pregnane.

3. 3α-(N',N'-dimethylaminoacetoxy) - 20β - (N,N - dimethylamino)-5β-pregnane.

4. The dihydrochloride of 3α - (N',N'-dimethylaminoacetoxy)-20β-(N,N-dimethylamino)5β-pregnane.

5. 20β-N-benzylamino-5β-pregnane-3α-ol.

6. 20-benzylimino-5β-pregnane-3α-ol.

7. A process for the preparation of a compound selected from the group consitsing of 20β-amino-5β-pregnanes of the formula

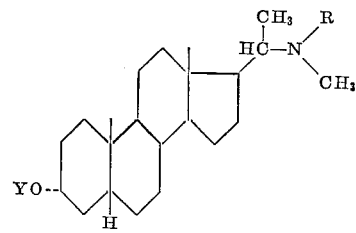

wherein R is an alkyl radical having 1 to 4 carbon atoms and Y is selected from the group consisting of hydrogen and an acyl radical of an organic carboxylic acid having 1 to 18 carbon atoms and their non-toxic, pharmaceutically acceptable acid addition salts which comprises condensing 5β-pregnane-3α-ol-20-one with a primary alkylamine having 1 to 4 carbon atoms to form the corresponding 20β-imino-5β-pregnane-3α-ol, reducing the latter with an alkali metal borohydride to form the corresponding 20β-(N-alkylamino)-5β-pregnane-3α-ol, subjecting the latter to methylation to form the corresponding 20β-(N,N-alkylmethylamino)-5β-pregnane-3α-ol and recovering the desired product.

8. The process of claim 7 wherein the amine is methylamine.

9. The process of claim 7 wherein the alkali metal borohydride is sodium borohydride.

10. A process for the preparation of 20β-(N,N-dimethylamino)-5β-pregnane-3α-ol which comprises condensing 5β-pregnane-3α-ol-20-one with benzylamine to form 20β-benzylimino-5β-pregnane-3α-ol, reducing the latter with an alkali metal borohydride to form 20β-N-benzylamino-5β-pregnane-3α-ol, subjecting the latter to hydrogenolysis to form 20β-amino-5β-pregnane-3α-ol, methylating the latter with a mixture of formaldehyde and formic acid to form 20β-(N,N-dimethylamino)-5β-pregnane-3α-ol and recovering the latter.

11. A process for the preparation of 20β-(N,N-dimethylamino)-5β-pregnane-3α-ol which comprises condensing 5β-pregnane-3α-ol-20-one with methylamine in the presence of sodium methylate to form 20-methylimino-5β-pregnane-3α-ol, reducing the latter with an alkali metal borohydride to form 20β-methylamino-5β-pregnane-3α-ol, reacting the latter with formaldehyde in the presence of hydrogen and a catalyst to form 20β-(N,N-dimethylamino)5β-pregnane-3α-ol and recovering the latter.

References Cited by the Examiner
UNITED STATES PATENTS

| | | | |
|---|---|---|---|
| 2,983,736 | 5/1961 | Georgian et al. | 260—397.45 |
| 3,036,097 | 5/1962 | Holton | 260—397.5 |
| 3,098,082 | 7/1963 | Mainil et al. | 260—397.3 |

LEWIS GOTTS, *Primary Examiner.*

H. A. FRENCH, *Assistant Examiner.*